(12) United States Patent
Lee et al.

(10) Patent No.: US 11,629,292 B2
(45) Date of Patent: Apr. 18, 2023

(54) COATING COMPOSITION

(71) Applicant: LG Chem, Ltd., Seoul (KR)

(72) Inventors: Hyun Jun Lee, Daejeon (KR); Jung Sun You, Daejeon (KR); Dong Hyun Oh, Daejeon (KR); Eun Jung Lim, Daejeon (KR)

(73) Assignee: LG Chem, Ltd.

( * ) Notice: Subject to any disclaimer, the term of this patent is extended or adjusted under 35 U.S.C. 154(b) by 150 days.

(21) Appl. No.: 16/962,653

(22) PCT Filed: Jan. 24, 2019

(86) PCT No.: PCT/KR2019/001000
§ 371 (c)(1),
(2) Date: Jul. 16, 2020

(87) PCT Pub. No.: WO2019/151709
PCT Pub. Date: Aug. 8, 2019

(65) Prior Publication Data
US 2020/0354634 A1    Nov. 12, 2020

(30) Foreign Application Priority Data

Jan. 30, 2018   (KR) .......................... 10-2018-0011163

(51) Int. Cl.
*G02F 1/1337* (2006.01)
*C09K 19/56* (2006.01)
(Continued)

(52) U.S. Cl.
CPC ................ *C09K 19/56* (2013.01); *C09D 7/20* (2018.01); *C09D 7/61* (2018.01); *C09D 7/67* (2018.01);
(Continued)

(58) Field of Classification Search
CPC .......... C09K 19/56; C09K 19/60; C09D 7/20; C09D 7/61; C09D 7/67; C09D 7/69;
(Continued)

(56) References Cited

U.S. PATENT DOCUMENTS

2005/0243264 A1   11/2005   Sikharulidze
2013/0216807 A1   8/2013    Wakefield et al.
(Continued)

FOREIGN PATENT DOCUMENTS

CN   105238112 A   1/2016
CN   105572946 A   5/2016
(Continued)

OTHER PUBLICATIONS

KR 101619849 B1 translation (Year: 2016).*
(Continued)

*Primary Examiner* — James A Dudek
(74) *Attorney, Agent, or Firm* — Lerner David LLP

(57) ABSTRACT

A coating composition, a method for manufacturing a substrate using the same, and an optical device are provided. The method for manufacturing the substrate provides the substrate having excellent performance, as the substrate has fixed spacers on its surface by using a single layer in which nanoparticles and spacers are dispersed in an alignment film to reduce processes and cost. The optical device may be manufactured by such method.

13 Claims, 1 Drawing Sheet

(51) Int. Cl.
| | |
|---|---|
| *C09D 7/40* | (2018.01) |
| *C09D 7/61* | (2018.01) |
| *C09D 7/20* | (2018.01) |
| *C09D 179/08* | (2006.01) |
| *C09K 19/60* | (2006.01) |
| *G02F 1/1339* | (2006.01) |

(52) U.S. Cl.
CPC .............. *C09D 7/69* (2018.01); *C09D 179/08* (2013.01); *C09K 19/60* (2013.01); *G02F 1/1339* (2013.01); *G02F 1/133711* (2013.01); *G02F 1/13398* (2021.01); *G02F 2202/043* (2013.01); *G02F 2202/36* (2013.01)

(58) Field of Classification Search
CPC .............. C09D 179/08; G02F 1/133711; G02F 1/1339; G02F 2202/043; G02F 2202/36
See application file for complete search history.

(56) References Cited

U.S. PATENT DOCUMENTS

| | | |
|---|---|---|
| 2017/0190906 A1 | 7/2017 | Mutou |
| 2018/0051144 A1 | 2/2018 | Kwon et al. |
| 2018/0106929 A1 | 4/2018 | Song et al. |
| 2019/0079327 A1 | 3/2019 | Kim et al. |

FOREIGN PATENT DOCUMENTS

| | | |
|---|---|---|
| CN | 106471059 A | 3/2017 |
| CN | 107406602 A | 11/2017 |
| CN | 107635765 A | 1/2018 |
| EP | 0022311 A1 | 1/1981 |
| EP | 3251832 A1 | 12/2017 |
| JP | H06175139 A | 6/1994 |
| JP | 2003005187 A | 1/2003 |
| JP | 2004246092 A | 9/2004 |
| JP | 2008268309 A | 11/2008 |
| JP | 2015011074 A | 1/2015 |
| JP | 2015127292 A | 7/2015 |
| KR | 20040092881 A | 11/2004 |
| KR | 20130092565 A | 8/2013 |
| KR | 20160004596 A | 1/2016 |
| KR | 20170072573 A | 6/2017 |
| TW | 201741689 A | 12/2017 |
| WO | 2017105051 A1 | 6/2017 |

OTHER PUBLICATIONS

Extended European Search Report including Written Opinion for Application No. 19746705.3 dated Feb. 18, 2021, pp. 1-8.

Sikharulidze, David et al., 67.3: Electrophoretically Controlled Nematic LCD: Plastic Bistable Technology with Memorized Intrinsic Grey Scale, May 2008, pp. 1030-1033, SID International Symposium, Los Angeles, USA.

International Search Report for Application No. PCT/KR2019/001000 dated Apr. 29, 2019, 2 pages.

Taiwan Search Report for Application No. 10820977210 dated Oct. 17, 2019, 1 page.

Zhan Yixing, "New Products of Fine Chemicals (2nd collection)" (Jun. 2007). 3 pgs.

Jing Xiao, et al., "Dictionary of Chemistry for Use in Middle School", (Apr. 1998) 3 pgs.

Search Report dated Jan. 25, 2022 from Office Action for Chinese Application No. 201980010625.7 dated Jan. 29, 2022. 3 pgs.

\* cited by examiner

[Figure 1]
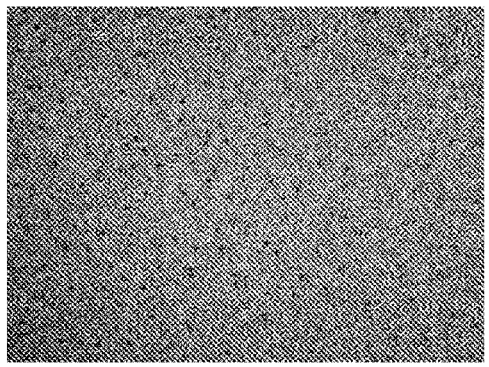
[Figure 2]
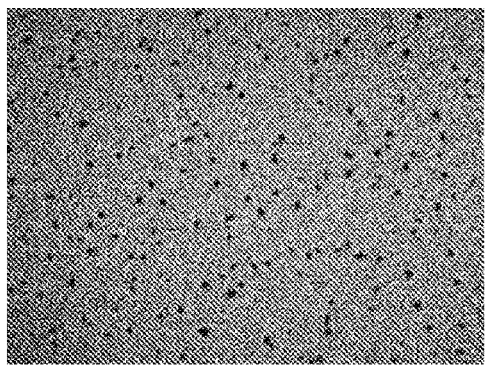
[Figure 3]
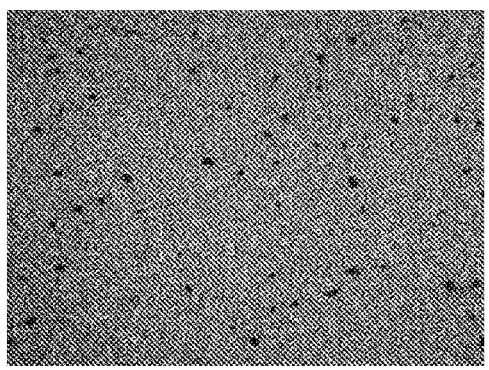

COATING COMPOSITION

CROSS-REFERENCE TO RELATED APPLICATION

The present application is a national phase entry under 35 U.S.C. § 371 of International Application No.: PCT/KR2019/001000 filed Jan. 24, 2019 which claims priority from Korean Patent Application No.: 10-2018-0011163 filed on Jan. 30, 2018, the disclosure of which is incorporated herein by reference in its entirety.

TECHNICAL FIELD

The present application relates to a coating composition, a method for manufacturing a substrate using the same, and an optical device.

BACKGROUND ART

An optical device capable of adjusting light transmittance or color, and the like by disposing a light modulating layer between substrates is known. For example, a so-called GH cell (guest host cell) to which a mixture of a liquid crystal host and a dichroic dye guest is applied has been disclosed in Patent Document 1 (European Patent Publication No. 0022311).

Such an optical device generally comprises two layers of substrates disposed opposite each other and the light modulating layer present between the substrates and also comprises a spacer to maintain a gap between the substrates.

The spacer typically includes so-called column spacer and ball spacer, and in the case of using the ball spacer, a structure in which the ball spacer is fixed in an alignment film is also known. Such a spacer is also referred to as a so-called fixed spacer. Such a structure is particularly useful when an optical device is manufactured using a flexible substrate, because it is possible to maintain a uniform cell gap without causing a phenomenon that the ball spacers are moved or aggregated when the substrate is bent.

Therefore, proper dispersion of the spacers is not only required for maintaining a uniform cell gap, but also can suppress the occurrence of haze.

DISCLOSURE

Technical Problem

The present application relates to a coating composition, a method for manufacturing a substrate using the same and an optical device. It is an object of the present application to provide a coating composition capable of producing a haze-free substrate, in which spacers fixed in an alignment film are uniformly dispersed on a surface thereof, by a simple and low-cost process, a method for manufacturing a substrate using the same and an optical device.

Technical Solution

The present application relates to a coating composition. An exemplary coating composition of the present application comprises a substance for forming an alignment film, spacers and nanoparticles, wherein the density of the spacers may be smaller than the density of the nanoparticles and the density of the nanoparticles may be in a range of 1.5 $g/cm^3$ to 10 $g/cm^3$.

The present application relates to a method for manufacturing a substrate. An exemplary method for manufacturing a substrate of the present application comprises a process of forming an alignment film on a base layer using a coating composition, wherein the coating composition may comprise a substance for forming an alignment film, spacers and nanoparticles, the density of the spacers may be smaller than the density of the nanoparticles and the density of the nanoparticles may be in a range of 1.5 $g/cm^3$ to 10 $g/cm^3$.

The present application relates to an optical device. An exemplary optical device of the present application is an optical device comprising a first substrate, a second substrate disposed opposite to the first substrate, and a light modulating material existing between the first substrate and the second substrate, wherein an alignment film may be formed on the surface of the first substrate facing the second substrate and/or the surface of the second substrate facing the first substrate, the alignment film may comprise a substance for forming an alignment film, spacers and nanoparticles, the density of the spacers may be smaller than the density of the nanoparticles, and the density of the nanoparticles may be in a range of 1.5 $g/cm^3$ to 10 $g/cm^3$.

Advantageous Effects

The present application can provide a method for manufacturing a substrate having excellent performance, as a substrate having fixed spacers on its surface, by using a single layer in which nanoparticles and spacers are dispersed in an alignment film to reduce processes and cost, and an optical device manufactured by such a method.

BRIEF DESCRIPTION OF DRAWINGS

FIGS. 1 to 3 are images obtained by observing Example 1, Comparative Example 1 and Comparative Example 2 of the present application with an optical microscope.

MODE FOR INVENTION

The present application relates to a coating composition. An exemplary coating composition of the present application may comprise a substance for forming an alignment film, spacers and nanoparticles.

In the present application, an alignment film is formed on the base layer in order to control an alignment state of a liquid crystal compound. The kind of the alignment film used in the present application is not particularly limited, and a known alignment film can be used. For example, all the known alignment films may be applied, which satisfy suitable coating properties, solubility in solvents, heat resistance, chemical resistance, durability against orientation treatment such as rubbing, and the like, exhibit appropriate tilting characteristics and the like, if necessary, and satisfy physical properties such as a proper voltage holding ratio (VHR) and a high contrast ratio through impurity management. The alignment film may be, for example, a vertical or horizontal alignment film. As the vertical or horizontal alignment film, an alignment film having a vertical or horizontal orientation capability with respect to the liquid crystal compound of the adjacent liquid crystal layer can be selected without any particular limitation and used. As such an alignment film, for example, a contact type alignment film such as a rubbing alignment film, or an alignment film known to be capable of exhibiting orientation characteristics by a non-contact method such as irradiation of linearly polarized light by including a photo alignment film compound can be used.

The alignment film may be produced by applying, as an alignment film forming material comprising a substance for forming an alignment film, for example, an alignment film forming material prepared by dispersing, diluting and/or dissolving the substance for forming an alignment film in a suitable solvent.

The substance for forming an alignment film may be a substance for forming a rubbing alignment film or a substance for forming a photo alignment film. In the kind of the substance for forming an alignment film, any kind of materials known to be capable of exhibiting an orientation capability, such as a vertical or horizontal orientation capability, to liquid crystals by an appropriate treatment can be used.

The substance for forming an alignment film may comprise one or more selected from the group consisting of materials known to exhibit an orientation capability, such as a polyimide compound, a poly(vinyl alcohol) compound, a poly(amic acid) compound, a polystyrene compound, a polyamide compound and a polyoxyethylene compound, or materials known to be capable of exhibiting an orientation capability by light irradiation, such as a polyimide compound, a polyamic acid compound, a polynorbornene compound, a phenylmaleimide copolymer compound, a polyvinyl cinnamate compound, a polyazobenzene compound, a polyethyleneimide compound, a polyvinylalcohol compound, a polyamide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound, but is not limited thereto.

The ratio of the substance for forming an alignment film in the coating composition may be 0.1 to 10 wt %. In another example, the ratio may also be about 0.3 wt % or more, about 0.5 wt % or more, about 0.7 wt % or more, about 0.9 wt % or more, about 1.1 wt % or more, or about 1.3 wt % or more, or may be about 9 wt % or less, about 8 wt % or less, about 7 wt % or less, about 6 wt % or less, about 5 wt % or less, about 4 wt % or less, about 3 wt % or less, or about 2 wt % or less or so. If the ratio of the substance for forming an alignment film is less than the above range, the alignment film is coated too thinly, so that it is difficult to fix the spacers and the nanoparticles, whereas if the ratio exceeds the above range, the thickness of the alignment film becomes thick, so that problems such as light leakage occur due to cell gap maintenance and tail generation around the spacers at the time of manufacturing an optical device.

The alignment film forming material can be prepared by diluting, dispersing and/or dissolving such a substance for forming an alignment film in a solvent. At this time, basically, the applicable solvent is not particularly limited. For example, as the solvent, any one selected from a cycloalkane with 3 to 12 carbon atoms or 3 to 8 carbon atoms such as cyclohexane, DMSO (dimethyl sulfoxide), THF (tetrahydrofuran), DMF (dimethylformamide), NMP (N-methyl-pyrrolidone), chloroform ($CHCl_3$), a ketone solvent such as gamma-butyrolactone or cyclopentanone, an alcohol such as 2-butoxyethanol, or a glycol such as ethylene glycol, or a mixed solvent of two or more selected from the foregoing can be applied.

In one example, in order to form a suitable alignment film, the viscosity of the alignment film forming material can be controlled in a predetermined range.

For example, the alignment film forming material may have a viscosity within a range of about 5 cP to 25 cP. The viscosity may be, for example, about 20 cP or less, 18 cP or less, 16 cP or less, 14 cP or less, or 13 cP or less. By applying the coating composition in which the spacers are mixed with the alignment film forming material having such a viscosity, an alignment film which the spacers are fixed in a state of being uniformly dispersed can be effectively formed on the base layer.

Among physical properties mentioned in the present application, when the measured temperature affects the physical property, the relevant physical property may be a physical property measured at room temperature, unless otherwise specified. The term normal temperature is a natural temperature without warming or cooling, which may be, for example, any temperature in a range of about 10° C. to 30° C., about 23° C. or about 25° C. or so.

In addition, among physical properties mentioned in the present application, when the measured pressure affects the physical property, the relevant physical property may be a physical property measured at normal pressure, unless otherwise specified. The term normal pressure is a natural pressure, which is generally a pressure of about one atmosphere, such as atmospheric pressure.

The average diameter mentioned in the present application is a volume average value D50 (that is, a particle diameter or a median diameter when the cumulative volume becomes 50%) in particle size distribution measurement by a laser light diffraction method, which may mean representing a value measured using a particle size analyzer.

In the present application, the coating composition comprises a spacer together with the substance for forming an alignment film. At this time, the kind of the applied spacer is not particularly limited. In one example, as the spacer, a known ball spacer or column spacer may be used. As the spacer, for example, a spacer having a suitable size can be used in consideration of a desired cell gap, without any particular limitation on its size. In one example, the D50 particle diameter of the ball spacer or the height of the column spacer may be about 1 μm or more. In another example, the particle diameter or height may be about 2 μm or more, about 3 μm or more, about 4 μm or more, about 5 μm or more, 6 μm or more, 7 μm or more, 8 μm or more, 9 μm or more, 10 μm or more, 11 μm or more, 12 μm or more, 13 μm or more, 14 μm or more, or 14.5 μm or more, and may be 30 μm or less, 29 μm or less, 28 μm or less, 27 μm or less, 26 μm or less, 25 μm or less, 24 μm or less, 23 μm or less, 22 μm or less, 21 μm or less, 20 μm or less, 19 μm or less, 18 μm or less, 17 μm or less, 16 μm or less, 16.5 μm or less, 15 μm or less, 14 μm or less, 13 μm or less, or 12.5 μm or less.

The density of the spacers may be in a range of 1 $g/cm^3$ to 5 $g/cm^3$, and specifically, it may be in a range of 1 $g/cm^3$ to 4 $g/cm^3$, 1 $g/cm^3$ to 3.5 $g/cm^3$, 1 $g/cm^3$ to 3 $g/cm^3$, 1 $g/cm^3$ to 2.5 $g/cm^3$, 1 $g/cm^3$ to 2 $g/cm^3$, or 1 $g/cm^3$ to 1.5 $g/cm^3$ or so, but is not limited thereto.

The ratio (B/A) of the density (A) of the spacers to the density (B) of the nanoparticles may be in a range of 1 to 10. In another example, the ratio (B/A) may be about 1.2 or more, 1.4 or more, 1.5 or more, 1.6 or more, or 1.8 or more, or may be 9 or less, 8 or less, 7 or less, 6 or less, 5 or less, 4 or less, or 3 or less, but is not limited thereto.

The ratio of the spacer in the coating composition is not particularly limited, and it may be, for example, contained in a ratio of 0.5 to 10,000 parts by weight relative to 100 parts by weight of the substance for forming an alignment film. In another example, the ratio may be about 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, 5 parts by weight or more, 5.5 parts by weight or more, 6 parts by weight or more, 6.5 parts by weight or more, 7 parts by weight or more, 7.5 parts by weight or more, 8 parts by weight or more, 8.5 parts by weight or more, 9 parts by weight or more, 9.5 parts by weight or more, 10 parts by weight or more, 11 parts by weight or more, or 12 parts by weight or more, or may be about 9000 parts by weight or less, 8000 parts by weight or less, 7000 parts by weight or less, 6000 parts by weight or less, 5000 parts by weight or less, 4000 parts by weight or less, 3000 parts by weight or less, 2000 parts by weight or less, 1000 parts by weight or less, 900 parts by weight or less, 800 parts by weight or less, 700 parts by weight or less, 600 parts by weight or less, 500 parts by weight or less, 400 parts by weight or less, 300 parts by weight or less, 200 parts by weight or less, 100 parts by weight or less, 90 parts by weight or less, 80 parts by weight or less, 70 parts by weight or less, 60 parts by weight or less, 50 parts by weight or less, 45 parts by weight or less, 40 parts by weight or less, 35 parts by weight or less, 30 parts by weight or less, 25 parts by weight or less, 20 parts by weight or less, or 15 parts by weight or less, but is not limited thereto. Such a ratio can be appropriately controlled in consideration of the desired dispersibility and the like.

In the present application, the coating composition may comprise nanoparticles, where the nanoparticles may have a higher density than that of the spacers. When the density of the nanoparticles is lower than that of the spacers, there are disadvantages that it is difficult to form irregularities near the base layer and they are not well dispersed. However, when the density of the nanoparticles is higher than that of the spacers, the nanoparticles are stacked near the base layer, so that it is easy to form irregularities.

The nanoparticle may be a spherical particle or a particle satisfying the following equation 1, but is not limited thereto.

$$LA < 3 \times SA \qquad [\text{Equation 1}]$$

In Equation 1 above, LA is the length of the major axis of the nanoparticle and SA is the length of the minor axis of the nanoparticle.

The lengths of the major axis and minor axis are measured using an electron microscope sectional image (SEM cross section image) of the coated base material.

The D50 particle diameter of the nanoparticles may be 1 μm or less, and specifically, may be from 10 nm to 1,000 nm, but is not limited thereto. In another example, the D50 particle diameter of the nanoparticles may be 10 nm or more, 20 nm or more, 30 nm or more, 40 nm or more, 50 nm or more, 60 nm or more, 70 nm or more, 80 nm or more, or 90 nm or more or so, or may be 900 nm or less, 800 nm or less, 700 nm or less, 600 nm or less, 500 nm or less, 400 nm or less, 300 nm or less, or 200 nm or less or so. In the case of nanoparticles within the above range, it is easy to disperse the nanoparticles.

The nanoparticles may have a density in a range of 1.5 g/cm$^3$ to 10 g/cm$^3$. In another example, the density may be 1.5 g/cm$^3$ to 9 g/cm$^3$, 1.5 g/cm$^3$ to 8 g/cm$^3$, 1.5 g/cm$^3$ to 7 g/cm$^3$, 1.5 g/cm$^3$ to 6 g/cm$^3$, 1.5 g/cm$^3$ to 5.5 g/cm$^3$, 1.5 g/cm$^3$ to 5 g/cm$^3$, 1.5 g/cm$^3$ to 4.5 g/cm$^3$, 1.5 g/cm$^3$ to 4 g/cm$^3$, 1.5 g/cm$^3$ to 3.5 g/cm$^3$, or 1.5 g/cm$^3$ to 3 g/cm$^3$ or 2 g/cm$^3$ to 3 g/cm$^3$ or so, but is not limited thereto. The density of the general PMMA series spacers is 1.5 g/cm$^3$ or less, but in order to form the irregularities by precipitating the nanoparticles before the spacers upon drying after coating the alignment film, the density of the nanoparticles should be 1.5 g/cm$^3$ or more, and generally, the density of the inorganic nanoparticles as dispersed and used is 10 g/cm$^3$ or less.

The ratio of the nanoparticles may be contained in a ratio of 0.01 to 10000 parts by weight relative to 100 parts by weight of the substance for forming an alignment film. In another example, the ratio may be about 0.05 parts by weight or more, about 0.1 parts by weight or more, about 0.5 parts by weight or more, or about 1 part by weight or more, or may be about 9000 parts by weight or less, 8000 parts by weight or less, 7000 parts by weight or less, 6000 parts by weight or less, 5000 parts by weight or less, 4000 parts by weight or less, 3000 parts by weight or less, 2000 parts by weight or less, 1000 parts by weight or less, 900 parts by weight or less, 800 parts by weight or less, 700 parts by weight or less, 600 parts by weight or less, 500 parts by weight or less, 400 parts by weight or less, 300 parts by weight or less, 200 parts by weight or less, 100 parts by weight or less, 90 parts by weight or less, 80 parts by weight or less, 70 parts by weight or less, 60 parts by weight or less, 50 parts by weight or less, 45 parts by weight or less, 40 parts by weight or less, 35 parts by weight or less, 30 parts by weight or less, 25 parts by weight or less, 20 parts by weight or less, 15 parts by weight or less, 10 parts by weight or less, 8 parts by weight or less, 6 parts by weight or less, 4 parts by weight or less, or 2 parts by weight or less or so, but is not limited thereto. If the ratio of the nanoparticles is lower than the above range, the nanoparticles cannot be dispersed, whereas if the ratio is higher than the above range, there is a drawback that the transmittance is lowered by increasing the haze.

The kind of the nanoparticles may be one or more selected from the group consisting of silica (silicon dioxide), aluminum oxide, titanium dioxide, zinc oxide, hafnium oxide, zirconium oxide, tin oxide, cerium oxide, magnesium oxide, nickel oxide, calcium oxide and yttrium oxide, and may be, for example, silica, but is not limited thereto.

The present application relates to a method for manufacturing a substrate, and in one example, it relates to a method for manufacturing a substrate by applying the above-described coating composition. The contents overlapping with those described in the above-mentioned coating composition will be omitted.

The manufacturing method may comprise a process of forming an alignment film on a base layer using the above-mentioned coating composition. In such a process, it can be formed, for example, by using an alignment film forming material comprising a substance for forming an alignment film.

In the present application, as the base layer, any base layer used as a substrate in a configuration of a known optical device such as, for example, an LCD (liquid crystal display) can be applied without particular limitation. For example, the base layer may be an inorganic base layer or an organic base layer. As the inorganic base layer, a glass base layer and the like can be exemplified, and as the organic base layer, various plastic films and the like can be exemplified. The plastic film can be exemplified by a TAC (triacetyl cellulose) film; a COP (cycloolefin copolymer) film such as a norbornene derivative; an acrylic film such as PMMA (poly (methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketon) film; a PPS (polyphenylsulfone) film; a PEI (polyetherimide) film; a PEN (polyethylenenaphthatate) film; a PET (polyethyleneterephtalate)

film; a PI (polyimide) film; a PSF (polysulfone) film or a PAR (polyarylate) film, and the like, but is not limited thereto.

The manufacturing method of the present application may be useful particularly when an organic base layer, for example, a plastic film, is used as the base layer. When dotting stains and the like occur, there is known a method of removing the stains by treating a device or the like with the stains at a high temperature, for example, a method of removing the stains by treating it at a temperature of Tni or higher of a liquid crystal compound which is an example of a light-modulating material. However, when the organic base layer is applied as the substrate, the heat resistance of the organic base layer is lowered, and thus it is difficult to perform the heat treatment process at a high temperature. However, by the method described in this specification, it is possible to prevent the occurrence of dotting stains even without the high-temperature treatment as described above, so that an alignment film having excellent physical properties can be formed even when the organic base layer is applied.

In the present application, the thickness of the base layer is not particularly limited, and an appropriate range may be selected depending on the application.

In the manufacturing method of the present application, an alignment film may also be formed directly on the base layer, or in a state where other layers or configurations exist on the base layer, it may also be formed on the other layers or configurations.

Here, an example of other layers or configurations is not particularly limited and includes all known layers and configurations necessary for driving and construction of an optical device. An example of such a layer or configuration includes an electrode layer or spacers.

In the present application, an alignment film is formed using such an alignment film forming material, and in this case, the forming method is not particularly limited. For example, the process of forming an alignment film may comprise a process of forming a layer of an alignment film forming material (the coating composition) on a base layer and a process of performing known treatment, such as the orientation treatment, on the formed layer.

The orientation treatment may be performed in a known manner. For example, an appropriate rubbing treatment may be performed in the case of a rubbing alignment film, or the orientation treatment may be performed through suitable light irradiation treatment in the case of a photo alignment film. The specific manner of performing each treatment is not particularly limited, and for example, the rubbing process may be applied by a method of using a rubbing cloth such as cotton, rayon or nylon, and the light irradiation process may be applied by a method of irradiating it with suitable linearly polarized light, or the like.

Furthermore, a pretreatment process such as a heat treatment and/or drying process may also be performed when the layer of the alignment film forming material is formed by coating or the like and the time to calcination is not constant for each substrate or when the calcination is not performed immediately after the coating. For example, the process such as heat treatment and/or drying can be performed using a suitable drier, oven, hot plate or the like.

Here, when the heat treatment and/or drying process is performed, the treatment temperature or time is not particularly limited, which can be appropriately adjusted. For example, the process may be performed at a temperature of about 50° C. or higher, about 60° C. or higher, about 70° C. or higher, about 80° C. or higher, about 90° C. or higher, about 100° C. or higher, about 110° C. or higher, or about 120° C. or higher. In addition, the temperature may be about 300° C. or lower, about 280° C. or lower, about 260° C. or lower, about 240° C. or lower, about 230° C. or lower, about 220° C. or lower, about 210° C. or lower, about 200° C. or lower, about 180° C. or lower, or about 160° C. or lower or so.

The treatment temperature of the process may also be selected in consideration of the state of the alignment film forming material, the temperature, and the like, and for example, an appropriate time may be selected within a range of about 1 minute to 2 hours.

Among physical properties mentioned in this specification, when the measured temperature affects the result, the physical property is a physical property measured at room temperature, unless specifically otherwise mentioned. The term room temperature is a natural temperature without warming and cooling, which may be, for example, any temperature within the range of about 10° C. to 30° C., or may be a temperature of about 23° C. or about 25° C. or so. Among physical properties mentioned in this specification, when the measured pressure affects the result, the physical property is a physical property measured at normal pressure, unless specifically otherwise mentioned. The term normal pressure is a natural pressure that the pressure is not specifically raised or lowered, which generally means a pressure of about one atmosphere or so, such as atmospheric pressure.

The present application also relates to a method for manufacturing an optical device. An exemplary method for manufacturing an optical device of the present application can be applied by the coating composition and/or the method for manufacturing a substrate as described above.

The exemplary method for manufacturing an optical device of the present application may comprise a process of forming, in a first substrate and a second substrate disposed opposite to the first substrate, a layer of a coating composition on the surface of the first substrate facing the second substrate and/or the surface of the second substrate facing the first substrate, and aligning the layer. The coating composition may comprise a substance for forming an alignment film, spacers and nanoparticles, wherein the density of the spacers may be smaller than the density of the nanoparticles and the density of the nanoparticles may be in a range of 1.5 $g/cm^3$ to 10 $g/cm^3$.

The manufacturing method of the present application may further comprise a step of dotting a light modulating material containing a liquid crystal compound on the alignment film thus formed and a step of pressing the opposed substrate in a state where it is disposed opposite to a base layer having the light modulating material-dotted alignment film, so that the dotted light modulating material fills the gap between the base layer and the opposed substrate.

The procedure can be performed, for example, according to a proceeding method of the general dotting process, and the specific proceeding method is not particularly limited.

Also, the material of the liquid crystal compound or the like to be applied is not particularly limited, and a well-known suitable material is selected as necessary.

In addition, the kind of the opposed substrate which is disposed opposite to the base layer is not particularly limited, and a known substrate can be applied. For example, the substrate may also comprise a base layer and an alignment film formed on one side thereof, and may comprise other configurations such as an electrode layer, if necessary. The method of forming the alignment film formed on the base layer of the opposed substrate is not particularly limited, which may follow a known method. In one example, the method of forming the alignment film on the base layer of the opposed substrate may follow the alignment film formation method as described above.

There is no particular limitation on the gap between the base layer and the opposed substrate, that is, the so-called cell gap in the procedure. However, in one example, the gap may be about 1 µm or more. In another example, the gap may be 4 µm or more, about 5 µm or more, about 6 µm or more, about 7 µm or more, or about 8 µm or more, and the upper limit may be about 20 µm, about 18 µm, about 16 µm, about 14 µm, about 12 µm, or about 10 µm or so. Generally, when the cell gap is small, for example, when the cell gap is less than about 4 µm, the dotting stain problem is not greatly highlighted even in the case where the dotting process is applied, but when the cell gap becomes large, the problem is highlighted. However, in some cases, a high cell gap is required for the optical device as needed, where it is possible by applying the method of the present application to minimize or suppress the dotting stains even in the manufacture of a device with a high cell gap.

The present application also relates to an optical device, for example, an optical device manufactured by the coating compositions and the manufacturing method. The contents overlapping with those described in the coating composition and the optical device as described above will be omitted.

In the category of the term optical device, all kinds of devices formed so as to be capable of switching between two or more different optical states, such as, for example, high transmittance and low transmittance states, high transmittance, medium transmittance and low transmittance states, or states where different colors are implemented, may be included.

Such an optical device may comprise a first substrate, a second substrate disposed opposite the first substrate, and a light modulating material present between the first substrate and the second substrate. Here, at least one substrate of the first substrate and the second substrate may be formed in the above-described manner. For example, an alignment film is formed on the surface of the first substrate facing the second substrate or the surface of the second substrate facing the first substrate, wherein the alignment film may comprise a substance for forming an alignment film, spacers and nanoparticles, the density of the spacers may be smaller than the density of the nanoparticles and the density of the nanoparticles may be in a range of 1.5 g/cm$^3$ to 10 g/cm$^3$.

In one example, an alignment film formed from the coating composition comprising the substance for forming an alignment film, spacers and nanoparticles as described above may be formed on one surface of any substrate of the first substrate and the second substrate. An alignment film formed from an alignment film forming material, which does not contain spacers and nanoparticles, comprising the substance for forming an alignment film, may be formed on the other substrate.

If desired, the light modulating material may further comprise a dichroic dye. For example, the dichroic dyes can be classified into two types, which may mean, as molecules absorbing more light in a specific direction than in the other directions, a positive dichroic dye or a p-type dye, which is a dye absorbing the polarized light in the long axis direction of the molecule, and a negative dichroic dye or an n-type dye, which is a dye absorbing light in the vertical direction. Generally, such a dye may have an absorption spectrum in a narrow region around a wavelength causing maximum absorption. In addition, the dyes used in the guest host LCD can be evaluated by chemical and optical stability, colors and absorption spectrum widths, dichroic ratios, degrees of pigment order, solubility in hosts, degrees of non-ionization, extinction coefficients and purity, and characteristics such as specific resistance. Hereinafter, the dichroic dye is assumed to be a positive dye, unless otherwise stated.

In this specification, the term "dye" may mean a material capable of intensively absorbing and/or modifying light in at least some or the entire range within a visible light region, for example, a wavelength range of 400 nm to 700 nm, and the term "dichroic dye" may mean a material capable of dichroic absorption of light in at least some or the entire range of the visible light region.

As the dichroic dye, for example, a known dye known to have properties that can be aligned according to the alignment state of the liquid crystals can be selected and used. As the dichroic dye, for example, a black dye can be used. Such a dye is known, for example, as an azo dye or an anthraquinone dye, but is not limited thereto.

The dichroic ratio of the dichroic dye can be appropriately selected in consideration of the object of the present application. For example, the dichroic dye may have a dichroic ratio of 5 or more to 20 or less. In this specification, the term "dichroic ratio" may mean, for example, in the case of a p-type dye, a value obtained by dividing the absorption of the polarized light parallel to the long axis direction of the dye by the absorption of the polarized light parallel to the direction perpendicular to the long axis direction. The anisotropic dye may have the dichroic ratio at at least some wavelengths or any wavelength within the wavelength range of the visible light region, for example, within the wavelength range of about 380 nm to 700 nm or about 400 nm to 700 nm.

When the light modulating material comprises both a liquid crystal compound and a dichroic dye, the light modulating material may act as a guest-host type light modulating material. That is, as the dichroic dye is arranged together according to the arrangement of the liquid crystal compound, the guest-host type light modulating material may exhibit an anisotropic light absorbing effect by absorbing light parallel to the alignment direction of the dye and transmitting perpendicular light. In addition, the content of the anisotropic dye in the light modulating material may be suitably selected in consideration of the object of the present application. For example, the content of the anisotropic dye in the light modulating material may be 0.1 wt % or more to 10 wt % or less.

Furthermore, the cell gap of the optical device, that is, the gap between the first and second substrates, is not particularly limited. However, in one example, the gap may be about 1 µm or more. In another example, the gap may be about 4 µm or more, about 5 µm or more, about 6 µm or more, about 7 µm or more, or about 8 µm or more, and the upper limit may be about 20 µm, about 18 µm, about 16 µm, about 14 µm, about 12 µm or about 10 µm or so.

Hereinafter, the present application will be described in detail by way of examples according to the present application and comparative examples not complying with the present application, but the scope of the present application is not limited by the following examples.

Example 1

Manufacturing of First Substrate

The first substrate was manufactured using a PC (polycarbonate) film, in which an ITO (indium tin oxide) electrode layer was formed on one surface, having a thickness of 100 µm. As the coating composition, one (alignment film forming material) prepared by mixing spherical silica (SiO$_2$) nanoparticles having an average diameter (D50 diameter) of about 100 nm or so and a density of about 2.7 g/cm$^3$ or so, ball spacers having an average diameter (D50) of about 12 μm or so and a density of about 1.29 g/cm$^3$ or so and a polyimide series substance for forming an alignment film (Nissan, SE-7492) in a weight ratio of about 2:20:150 (nanoparticles:ball spacers:substance for forming an alignment film), and dispersing the mixture in a mixed solvent of N-methyl-2-pyrrolidone, butyl cellosolve and dipropyleneglycol monomethyl ether (DPM) in a concentration of about 1.5 wt % was used. The alignment film forming material was coated by a bar coating method (Meyer bar coating) so that the final thickness of the alignment film was about 200 nm or so. Subsequently, baking and imidizing processes were performed by holding the substrate in an oven at about 130° C. for about 20 minutes. Then, the baked and imidized layer was rubbed to form an alignment film.

Manufacturing of Second Substrate

The second substrate was manufactured by forming an alignment film so that the final thickness of the alignment film was about 250 nm or so in the same manner as the first substrate, except that an alignment film forming material prepared by dispersing a polyimide series substance for forming an alignment film (Nissan, SE-7492) in a mixed solvent of N-methyl-2-pyrrolidone, butyl cellosolve amd dipropyleneglycol monomethyl ether (DPM) as solvents in a concentration of about 2.0 wt % was used.

Manufacturing of Optical Device

After coating a sealant applied to usually manufacture a liquid crystal cell on the end of the first substrate and dotting a light modulating material (a mixture of MAT-16-969 liquid crystals (ne: 1.5463, no: 1.4757, ε∥: 7.4, ε⊥: 3.2, TNI: 85° C., Δn: 0.0706, Δε: 4.2) from Merck and an anisotropic dye (BASF, X12)) on the second substrate, the first and second substrates were bonded together, so that the dotted light modulating material spread evenly between the two substrates, to produce an optical device.

In the procedure, the cell gap between the upper and lower substrates was maintained at about 12 μm or so.

Comparative Example 1

First and second substrates, and an optical device were each manufactured in the same manner as in Example 1, except for using silica (SiO$_2$) nanoparticles having an average diameter (D50 diameter) of about 100 nm or so and a density of about 1.2 g/cm$^3$ or so as the nanoparticles of the coating composition at the time of manufacturing the first substrate.

Comparative Example 2

First and second substrates and an optical device were each manufactured in the same manner as in Example 1, except for using no nanoparticle in the coating composition at the time of manufacturing the first substrate.

Test Example

The degree of dispersion of the spacers and nanoparticles in the substrate or optical device produced in each of Examples and Comparative Examples was confirmed, and the degree of dispersion was observed using an optical microscope.

FIGS. 1 to 3 are the results of checking the degrees of dispersion of the spacers and the nanoparticles for Example 1 and Comparative Examples 1 and 2, respectively.

In the case of Example 1 of FIG. 1, it was confirmed that they were evenly dispersed throughout without any aggregation phenomenon, but in the case of Comparative Examples 1 and 2 of FIGS. 2 and 3, it was confirmed that unlike Example 1, the aggregation phenomenon occurred.

The invention claimed is:

1. An optical device, comprising:
   a first substrate;
   a second substrate disposed opposite to the first substrate;
   a light modulation material existing between the first substrate and the second substrate;
   a first alignment film formed on one surface of the first substrate; and
   second alignment film formed on one surface of the second substrate,
   wherein the first alignment film is formed from a coating composition which comprises a substance for forming an alignment film, spacers, and nanoparticles,
   wherein the second alignment film is formed from a coating composition which comprises a substance for forming alignment film but does not comprise spacers and nanoparticles,
   wherein a density of the spacers is smaller than a density of the nanoparticles and
   the density of the nanoparticles is in a range of 1.5 g/cm$^3$ to 10 g/cm$^3$.

2. The optical device according to claim 1, wherein the substance for forming the alignment film is a substance for forming a rubbing alignment film or a substance for forming a photo alignment film.

3. The optical device according to claim 1, wherein the substance for forming the alignment film comprises one or more selected from the group consisting of a polyimide compound, a poly(vinyl alcohol) compound, a poly(amic acid) compound, a polystyrene compound, a polyamide compound, a polyoxyethylene compound, a polynorbornene compound, a phenylmaleimide copolymer compound, a polyvinylcinnamate compound, a polyazobenzene compound, a polyethyleneimide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound.

4. The optical device according to claim 1, wherein an amount of the substance for forming the alignment film is 0.1 to 10 wt % relative to a total weight of the coating composition.

5. The optical device according to claim 1, wherein the spacers have a D50 particle diameter of 1 μm or more.

6. The optical device according to claim 1, wherein the density of the spacers is in the range of 1 g/cm$^3$ to 5 g/cm$^3$.

7. The optical device according to claim 1 wherein a ratio (B/A) of the density (A) of the spacers to the density (B) of the nanoparticles is in a range of 1.5 to 10.

8. The optical device according to claim 1, wherein the spacers are contained in a ratio of 0.5 to 10,000 parts by weight relative to 100 parts by weight of the substance for forming the alignment film.

9. The optical device according to claim 1, wherein the nanoparticles have a D50 particle diameter of 1 μm or less.

10. The coating composition according to claim 1, wherein the nanoparticles are spherical particles or particles satisfying the following equation 1:

$$LA < 3 \times SA \quad \text{[Equation 1]}$$

wherein, LA is the length of the major axis of the nanoparticle and SA is the length of the minor axis of the nanoparticle.

11. The optical device according to claim 1, wherein the nanoparticles are contained in a ratio of 0.01 to 10,000 parts by weight relative to 100 parts by weight of the substance for forming the alignment film.

12. The optical device according to claim 1, wherein the light modulating material further comprises a dichroic dye.

13. The optical device according to claim 1, wherein the nanoparticles are one or more selected from the group consisting of silica, aluminum oxide, titanium dioxide, zinc oxide, hafnium oxide, zirconium oxide, tin oxide, cerium oxide, magnesium oxide, nickel oxide, calcium oxide and yttrium oxide.

\* \* \* \* \*